US012732056B2

(12) United States Patent
Richard et al.

(10) Patent No.: US 12,732,056 B2
(45) Date of Patent: Sep. 8, 2026

(54) ENCLOSED TORQUE CONTROLLED ELECTRIC ACTUATOR AND METHOD

(71) Applicants: Premium Oilfield Technologies, LLC, Houston, TX (US); Rethink Motion, Inc., Houston, TX (US)

(72) Inventors: Neal C. Richard, Spring, TX (US); Aaron Hulse, League City, TX (US)

(73) Assignees: PREMIUM OILFIELD TECHNOLOGIES, LLC, Houston, TX (US); RETHINK MOTION INC., League City, TX (US)

( * ) Notice: Subject to any disclaimer, the term of this patent is extended or adjusted under 35 U.S.C. 154(b) by 1278 days.

(21) Appl. No.: 17/501,558

(22) Filed: Oct. 14, 2021

(65) Prior Publication Data

US 2022/0112788 A1 Apr. 14, 2022

Related U.S. Application Data

(60) Provisional application No. 63/091,780, filed on Oct. 14, 2020.

(51) Int. Cl.
*H02K 5/136* (2006.01)
*E21B 4/00* (2006.01)
*E21B 4/02* (2006.01)

(52) U.S. Cl.
CPC ............... *H02K 5/136* (2013.01); *E21B 4/00* (2013.01); *E21B 4/02* (2013.01)

(58) Field of Classification Search
CPC .......... H02K 7/14; H02K 11/33; H02K 11/24; H02K 5/10; H02K 5/136; E21B 34/025
See application file for complete search history.

(56) References Cited

U.S. PATENT DOCUMENTS

| | | | | |
|---|---|---|---|---|
| 5,523,662 A * | 6/1996 | Goldenberg | B25J 17/025 | 901/23 |
| 10,408,328 B1 * | 9/2019 | Jahnke | F16H 57/0486 | |
| 11,066,921 B1 * | 7/2021 | Brown | E21B 47/14 | |
| 2012/0089254 A1 * | 4/2012 | Shafer | B25J 17/00 | 901/46 |

(Continued)

FOREIGN PATENT DOCUMENTS

KR 100905023 B1 * 6/2009

*Primary Examiner* — Leda T Pham
(74) *Attorney, Agent, or Firm* — Jackson Walker LLP

(57) ABSTRACT

The present disclosure provides an actuator and related method of use that can change and control positions of chokes, valves, and other rotational equipment in response to changes in either pressure, torque, or a combination thereof. The actuator with associated integrated components including a servo motor, motor controller, torque sensor assembly, encoder, holding brake, and onboard controls can be encased in a sealed explosion proof rated enclosure for deployment on a drilling rig or other explosive environments with a small footprint suitable for space limited locations. Pressure applied over a known area, such as a choke plug, is converted to torque and can be repeated regardless of flow rate, temperature, fluid type, or density. The torque sensing ability advantageously can quickly respond to fluid changes and make large steps to different set points with accuracy. The onboard controls can control the actuator autonomously without constant communication with a remote controller.

22 Claims, 11 Drawing Sheets

(56) References Cited

U.S. PATENT DOCUMENTS

2015/0100159 A1* 4/2015 Park .................... H02K 11/21
310/68 B
2019/0017619 A1* 1/2019 Gagliano ............... H02K 5/136
2020/0158116 A1* 5/2020 Esberger ............. F04D 15/0066

* cited by examiner

ENCLOSED TORQUE CONTROLLED ELECTRIC ACTUATOR AND METHOD

CROSS REFERENCE TO RELATED APPLICATIONS

This application claims the benefit of U.S. Provisional Ser. No. 63/091,780, filed Oct. 14, 2020, and is incorporated fully herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to an apparatus and method of actuating rotatable equipment and controlling a rotatable position of the equipment based on a torque load. More specifically, the disclosure relates an actuator that can change and control positions of chokes, valves, and other rotational equipment in response to changes in either pressure, torque, or a combination thereof.

Description of the Related Art

Managed Pressure Drilling (MPD) is an adaptive drilling method with a goal of controlling the annular pressure within narrow limits throughout a wellbore. After determining the downhole pressure environment, drillers can manage wellbore pressure generally constrained by the limits of formation properties. A choke valve is typically used to manage pressure or flow rate. This management is done by taking data points upstream and downstream of the choke valve and comparing the results to a set point parameter. If the readings do not meet this parameter, the choke valve is then adjusted until the set point is met. An actuator that is connected to the choke valve can move a choke valve stem to make the adjustments to the flow and resulting pressure by moving a choke valve plug closer or further away from a choke valve seat.

There are several challenges to using an actuator due to the extreme conditions of a high degree of fluctuations in the well bore flow and pressure, an explosive environment, and a need for a small footprint on a crowded drilling rig. First, typical actuators are controlled primarily by predictive pressure control algorithms that utilize various methods of proportional—integral—derivative (PID) controllers. These control methods are generally adept at holding a constant pressure but has difficulties tracking pressure changes. PID controllers require a large amount of information to predict the choke position and to respond accordingly to changes on the rig site. Alternatively, a pressure balanced control system for an actuator can respond with more speed and track pressure changes better, but has difficulties responding at lower pressure ranges (less than 300 psi) and making precise pressure control changes. What is needed is a different type of control system such an actuator that can better perform both functions.

A second challenge is the harsh, explosive environment in which MPD operates. Historically, a hydraulic power unit (HPU), illustrated in FIGS. 1A and 1B, is located on or adjacent the drilling rig to supply pressurized hydraulic fluid to hydraulic cylinders, hydraulic motors, and other hydraulically operated equipment. The HPU is able to maintain a nonelectrical power source to the actuator to reduce the risk of electrical sparks in the explosive environment. However, the HPU has its own challenges including hydraulic leaks and safety issues as well as a large footprint on or adjacent to the drilling rig. In seeking a replacement for the HPU, an actuator having separate electrical motors, drives, power suppliers and other equipment, illustrated in FIG. 2, could create a spark that could set the drilling rig into an inferno. To reduce the risk, the electrical equipment is manufactured in its own secure and sealed enclosures. An explosion proof enclosure rated for such services can cost $20,000 to $30,000 alone. Combining the equipment into a single enclosure heretofore has not been possible due to the internal heat load in a sealed explosion proof container overheating the components. However, the separate enclosures require numerous electrical connections between the components and increases the amount of failure points as well as the risk of sparks and explosions. The third challenge is the footprint created by several enclosures is large. With limited space on a drill rig or adjacent thereto, a large footprint is impractical.

Therefore, there remains a needs for an improved electrical actuator with a small footprint that is classified for use in an explosive environment such as a drilling rig and other applications in which an actuator may be useful for controlling a movement of a chokes, valves, and other rotational equipment. Heretofore, such a unit has been thought to be impractical and potentially unachievable by those with ordinary skill in the art.

BRIEF SUMMARY OF THE INVENTION

The present disclosure provides an actuator and related method of use that can change and control positions of chokes, valves, and other rotational equipment in response to changes in either pressure, torque, or a combination thereof. The actuator with associated integrated components including a servo motor, motor controller, torque sensor assembly, encoder, holding brake, and onboard controls can be encased in a sealed explosion proof rated enclosure for deployment on a drilling rig, oil well pad, pipeline, petrochemical plant, paper and pulp mills, grain handling facilities, mines or other explosive environments with a small footprint suitable for space limited locations. Using a correlation of linear force to torque applied by an electric actuator, pressure applied over a known area, such as a choke plug, is converted to torque and can be repeated regardless of flow rate, temperature, fluid type, or density. The torque sensing ability advantageously can quickly respond to fluid changes and make large steps to different set points with accuracy. The onboard controls can control the actuator autonomously without needing constant communication with a remote controller. If communication is lost with a remote controller, the actuator can continue in operation or power down to a safe mode if desired.

The disclosure provides an actuator comprising: a housing having a plurality of components coupled therein, the housing being sealable from external liquids and gases, the components comprising: a servo motor mounted in the housing, the motor having an output shaft; a torque sensor assembly mounted in the housing and configured to sense torque from rotation of the servo motor output shaft; a motor controller in communication with the torque sensor; and a position encoder in communication with the motor controller.

The disclosure also provides a method of using an actuator, the actuator having a sealable housing with components sealed from an outside explosive atmosphere, the components comprising a servo motor, a torque sensor assembly, a motor controller, and a position encoder, comprising: instructing the motor controller to energize the servo motor; rotating the valve stem with the servo motor; sensing a torque to turn the valve stem with the torque sensor assembly; determining a rotational position of the valve stem with the encoder; and providing feedback when a desired position of the rotatable stem is reached to the motor controller to stop instructing the motor controller to energize the servo motor.

DETAILED DESCRIPTION

Figure 1A:
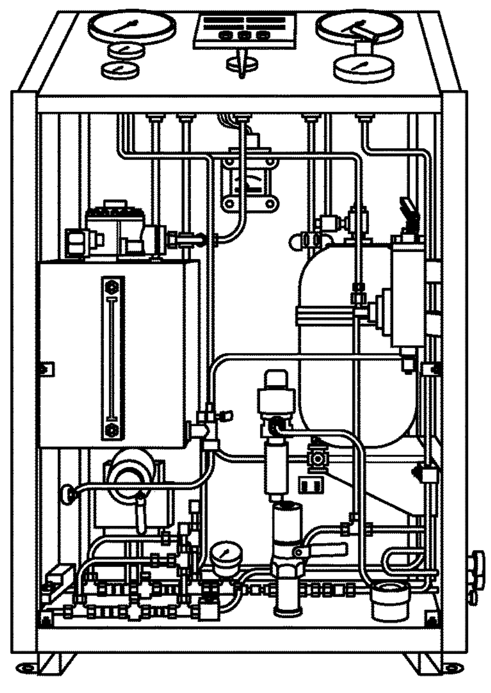
FIG. 1A is a front view illustration of a typical hydraulic power unit to provide pressurized hydraulic fluid to equipment including actuators.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

The present disclosure provides an actuator and related method of use that can change and control positions of chokes, valves, and other rotational equipment in response to changes in either pressure, torque, or a combination thereof. The actuator with associated integrated components including a servo motor, motor controller, torque sensor assembly, encoder, holding brake, and onboard controls can be encased in a sealed explosion proof rated enclosure for deployment on a drilling rig, oil well pad, pipeline, petrochemical plant, paper and pulp mills, grain handling facilities, mines or other explosive environments with a small footprint suitable for space limited locations. Using a correlation of linear force to torque applied by an electric actuator, pressure applied over a known area, such as a choke plug, is converted to torque and can be repeated regardless of flow rate, temperature, fluid type, or density. The torque sensing ability advantageously can quickly respond to fluid changes and make large steps to different set points with accuracy. The onboard controls can control the actuator autonomously without needing constant communication with a remote controller. If communication is lost with a remote controller, the actuator can continue in operation or power down to a safe mode if desired.

Figure 1B:
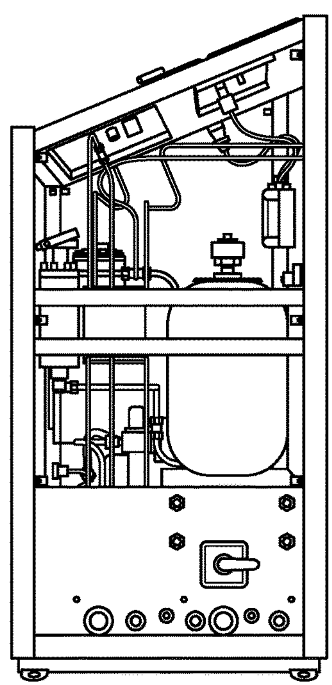
FIG. 1B is a side view illustration of a typical hydraulic power unit to provide pressurized hydraulic fluid to equipment including actuators.
Figure 2:
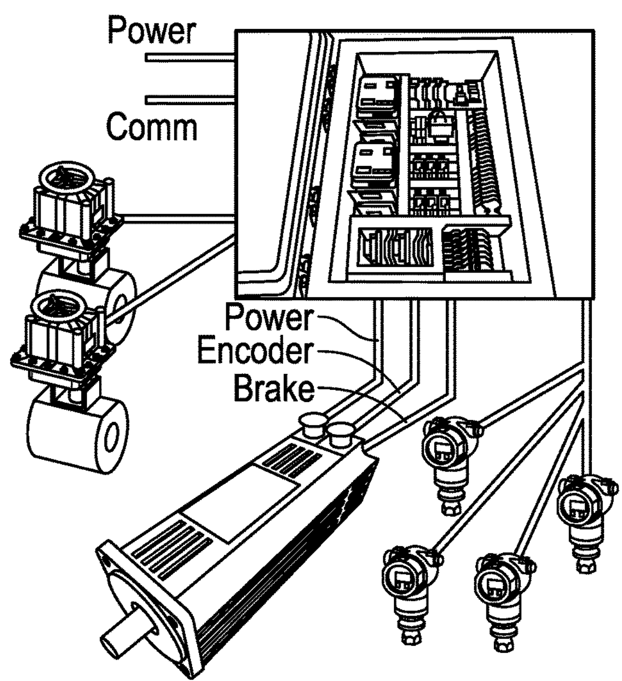
FIG. 2 is an illustration of a typical electric actuator system with various separate components due in part to heat loads.
Figure 3A:
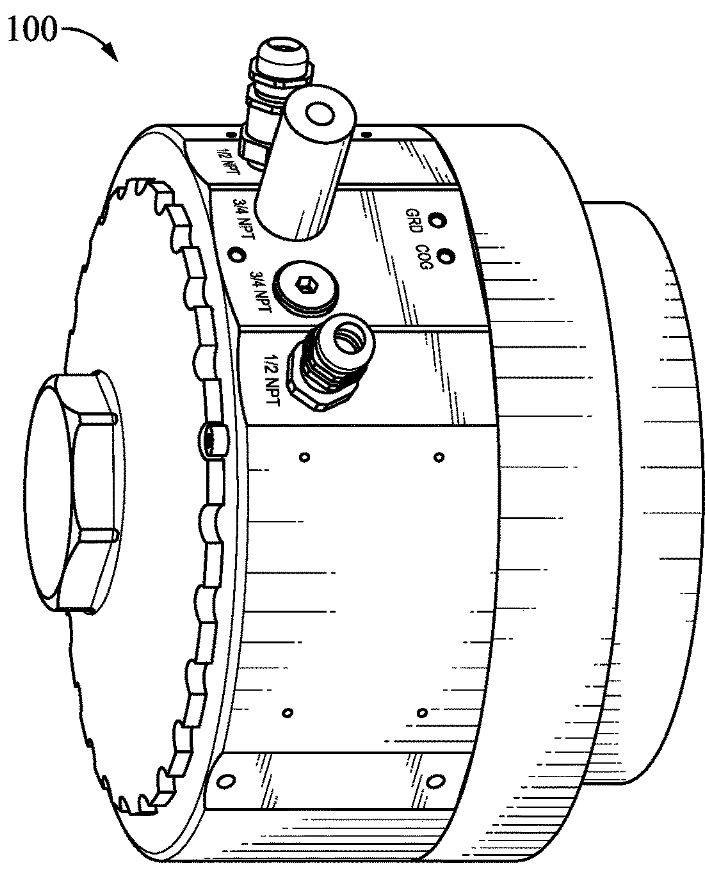
FIG. 3A is a left perspective illustration of an exemplary enclosed, torque-controlled, integrated, electric valve actuator according to the invention.
Figure 3B:
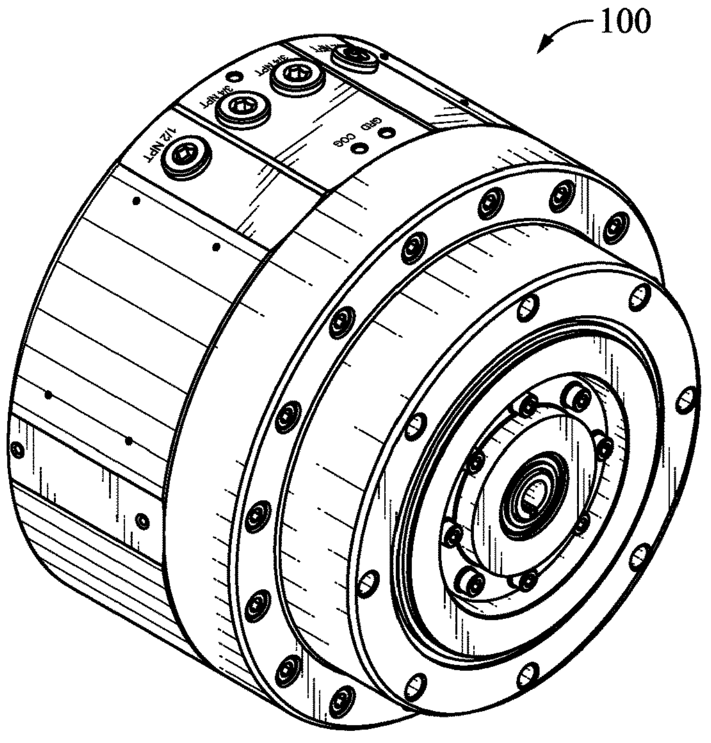
FIG. 3B is a right perspective illustration of the actuator of FIG. 3A.

FIG. 3A is a left perspective illustration of an exemplary enclosed, torque-controlled, integrated, electric valve actuator according to the invention. FIG. 3B is a right perspective illustration of the actuator of FIG. 3A. The size and external simplicity of an actuator 100 of the present invention contrast sharply with the complexity of the typical alternatives illustrated in FIGS. 1 and 2. The actuator 100 has uniquely integrated a system of components tailored to perform synergistically as an assembly in the housing that can operate in explosive environments. Major components in the housing are discussed below and include an explosion proof housing, servo motor, torque sensor assembly, position encoder, holding brake, and motor controller of onboard electronics. Yet, in at least one embodiment for a wellbore pressure rated 3" valve, the actuator is only about 16 inches in diameter and about 14 inches long. The housing qualifies for a Class 1 Division 1 rating, one of the highest ratings given to enclosures for explosive applications by the United States Department of Labor Occupational Safety and Health Administration, Section 1926, Safety and Health Regulations for Construction, Subpart K, Standard 1926.407. The Class 1 Division 1 rating essentially indicates that the actuator housing qualifies to be used in an area where ignitable concentrations of flammable gases, vapors or liquids can exist all of the time or some of the time under normal operating conditions. To qualify, the housing is essentially liquid and gas tight and explosion proof. An explosive atmosphere exposed to the actuator is generally prevented from leaking into the housing to cause an explosion from the electrical sparks inside the housing, particularly from the motor stator and rotor. Further, if an explosion occurs in the housing, the housing is designed to withstand an explosion inside that mitigates the explosion propagating into a larger explosion outside the housing. To the inventors' knowledge, no other integrated electrical actuator and drive on the market is rated this high. A challenge to prior designs for a Class 1 Division 1 rating in handling a heat load internal to an enclosure. Any heat that is generated internal to the housing has to be designed and managed to not exceed the capabilities of the internal components that otherwise would fail because no liquid or gas flow in or out of the housing can occur under the Class 1 Division 1 rating. The actuator of the present invention uniquely includes major components that heretofore have been kept separate due to high heat loads of the combination. With other systems, the cost of each separate component designed for a Class 1 Division 1 rating is commercially expensive and practically creates an undesirably large footprint on or near a drilling rig. With other systems, the high heat loads of a combined system in a single housing would so great that the loads would cause failure of internal components, including electronic circuitry. The actuator of the present invention has broken new ground with its design and integration of components while creating a reduced heat load. The design enables a total enclosure to be rated as a Class 1 Division 1 unit.

Figure 4A:
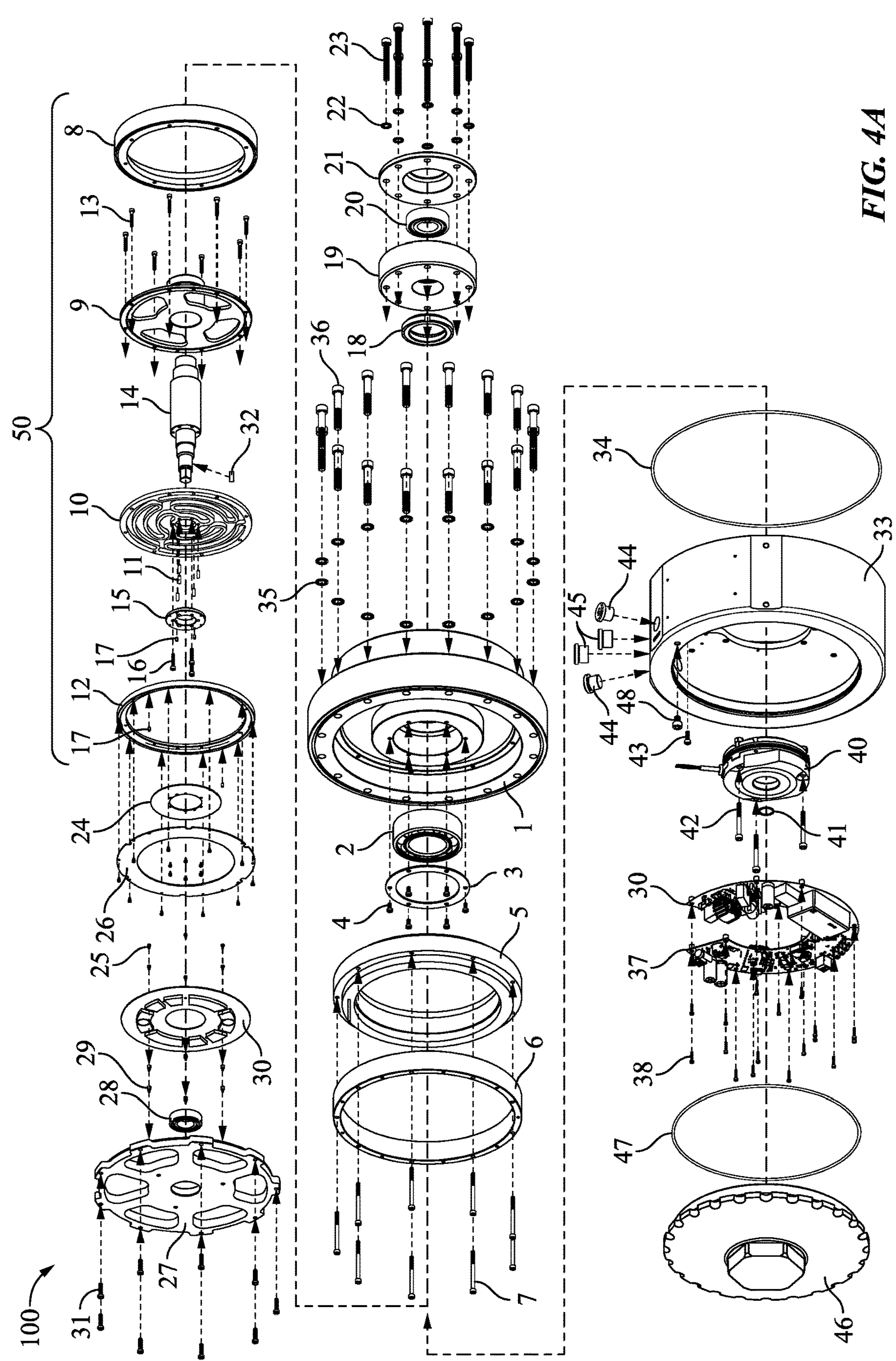
FIG. 4A is an illustrative left perspective assembly view of the actuator of FIGS. 3A and 3B.
Figure 4B:
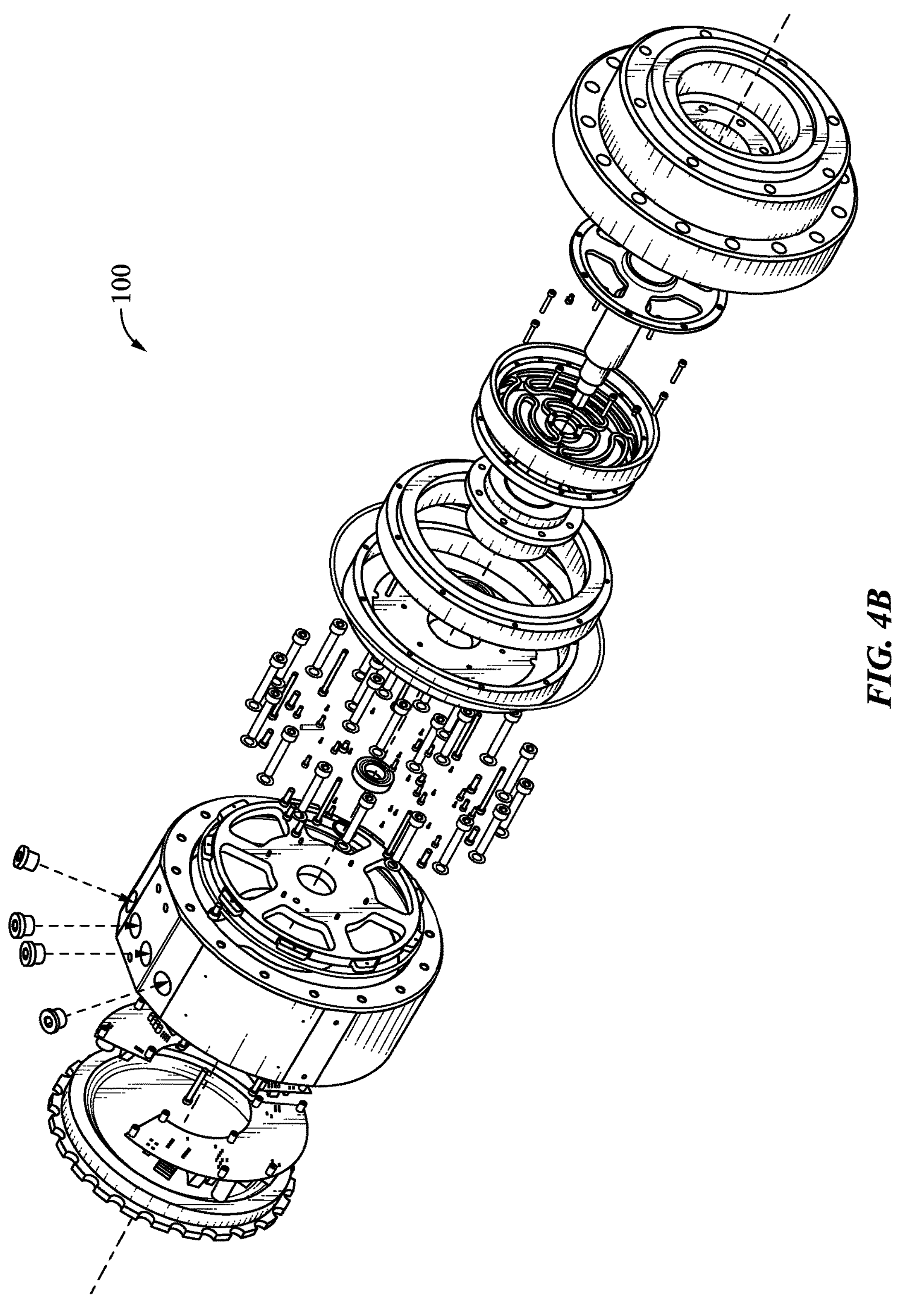
FIG. 4B is an illustrative right perspective assembly view of the actuator of FIGS. 3A and 3B.
Figure 5:
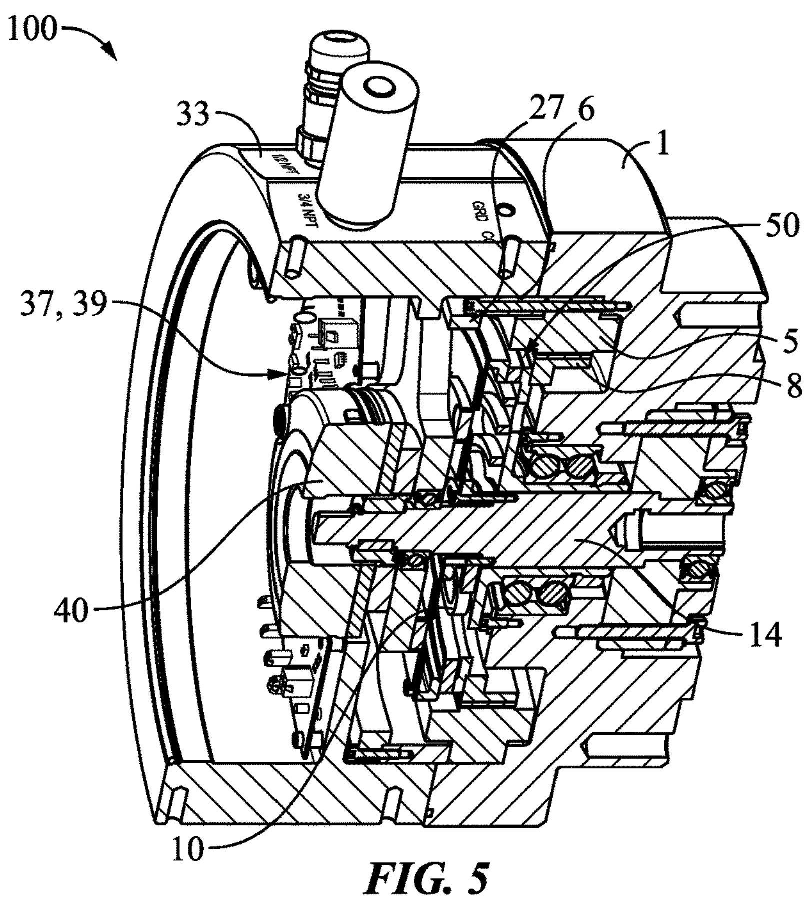
FIG. 5 is an illustrative cross section view of the actuator of FIGS. 3A and 3B.
Figure 6:
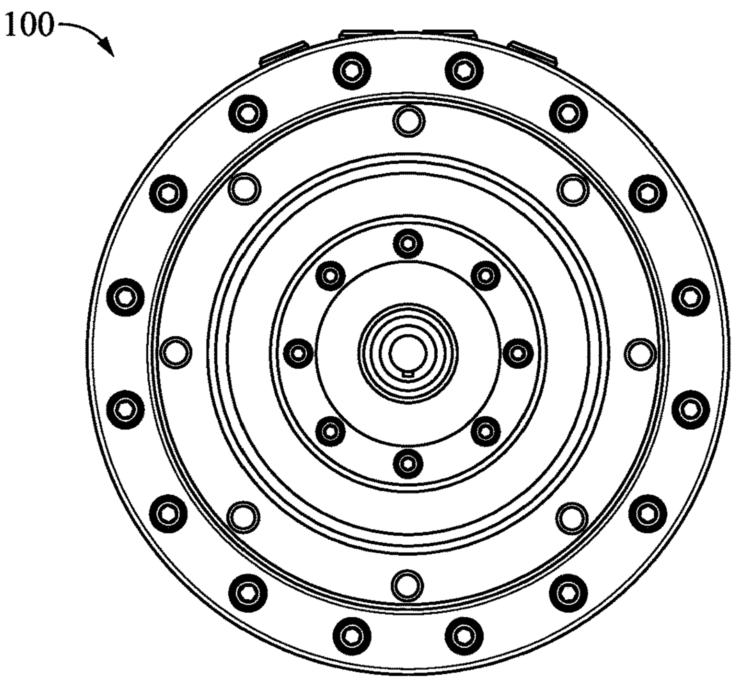
FIG. 6 is an illustrative end view of the right side of the actuator of FIG. 5.
Figure 8:
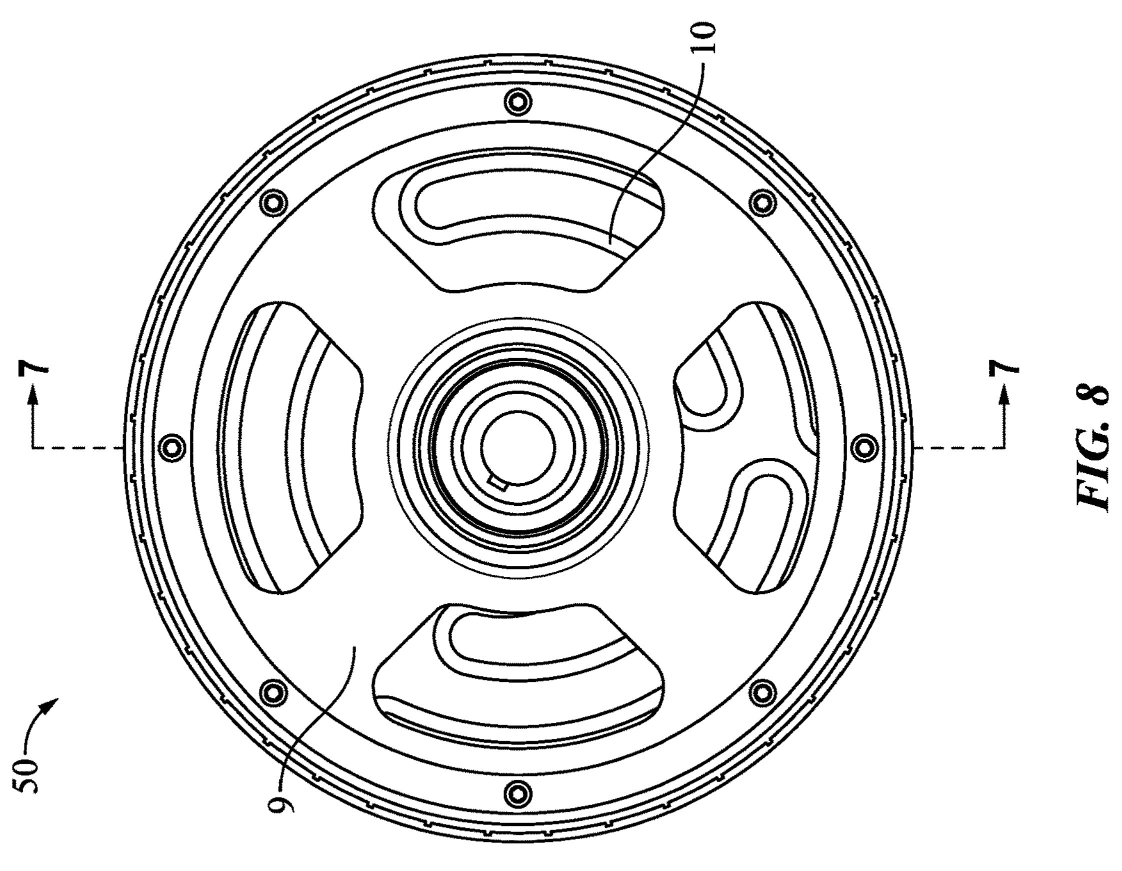
FIG. 8 is an illustrative end view of the right side of the torque sensor assembly and shaft of FIG. 7.
Figure 7:
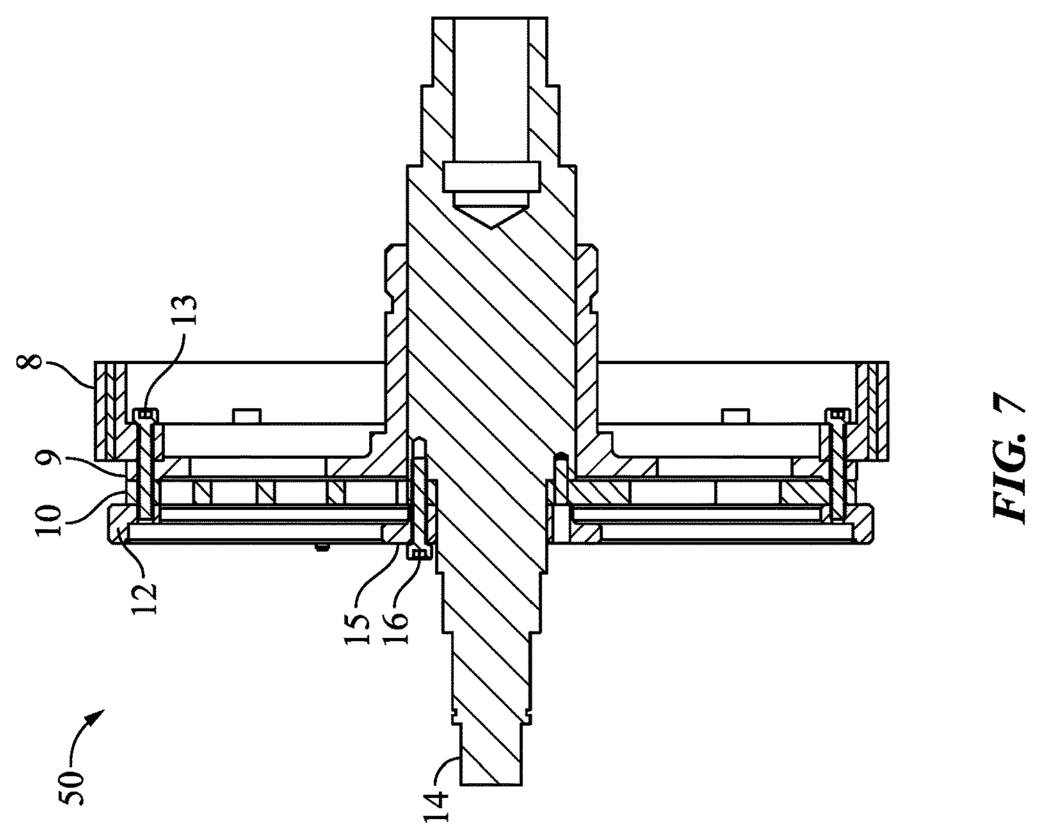
FIG. 7 is an illustrative cross section view of a torque sensor assembly coupled with an output shaft of the actuator of FIGS. 3A and 3B.
Figure 9:
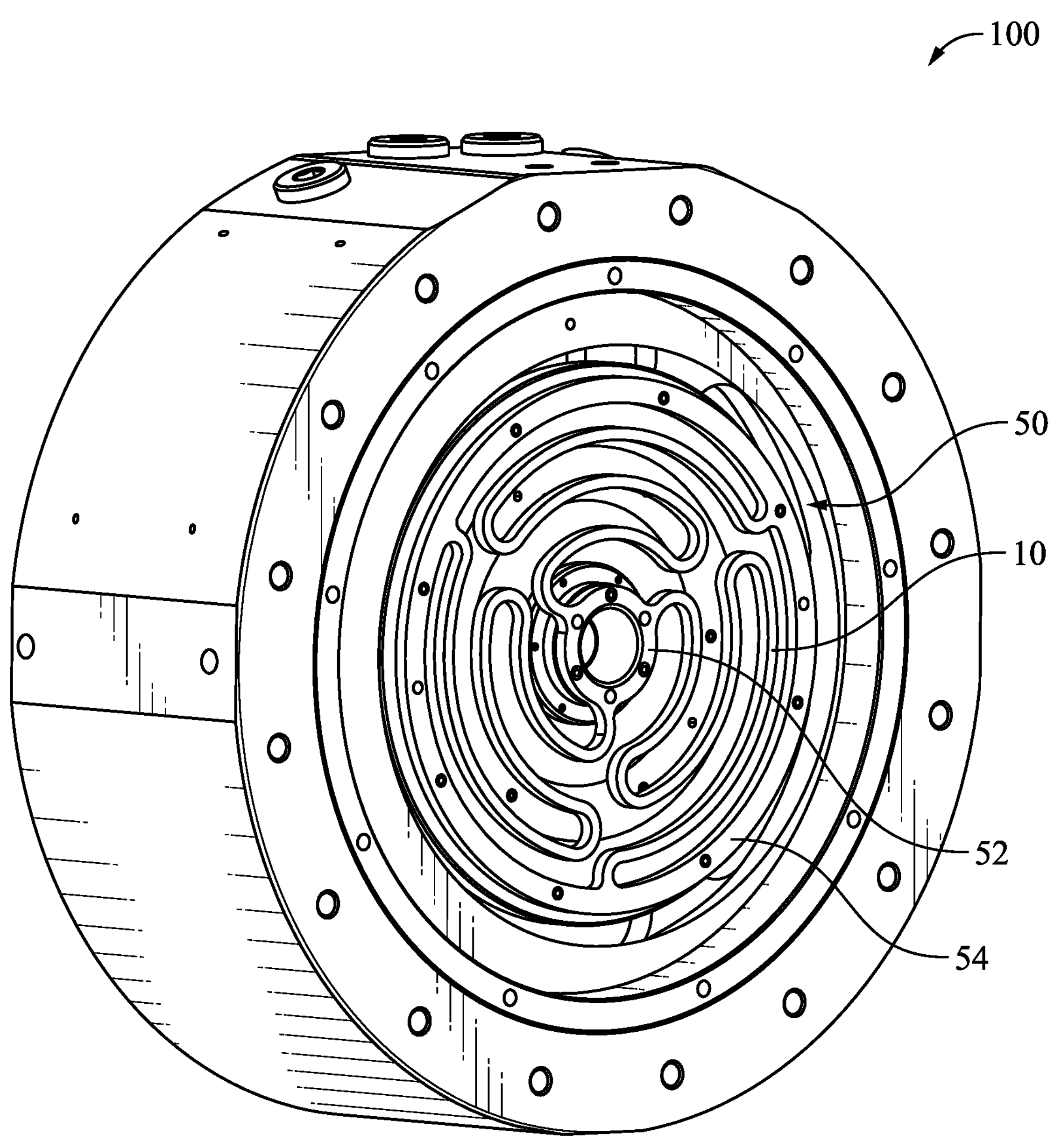
FIG. 9 is an illustrative cross section of the actuator showing the torque spring of the torque sensor assembly.

FIG. 4A is an illustrative left perspective assembly view of the actuator of FIGS. 3A and 3B. FIG. 4B is an illustrative right perspective assembly view of the actuator of FIGS. 3A and 3B. FIG. 5 is an illustrative cross section view of the actuator of FIGS. 3A and 3B. FIG. 6 is an illustrative end view of the right side of the actuator of FIG. 5. FIG. 7 is an illustrative cross section view of a torque sensor assembly coupled with an output shaft of the actuator of FIGS. 3A and 3B. FIG. 8 is an illustrative end view of the right side of the torque sensor assembly and shaft of FIG. 7. FIG. 9 is an illustrative cross section of the actuator showing the torque spring of the torque sensor assembly. The figures will be described in conjunction with each other with the focus on FIGS. 4A and 4B with the details of their assembly view with the other views being supplemental to show how the components are assembled in position.

Starting at the right side of the FIGS. 4A and 4B, the lower housing 1 includes a central opening for a seal and bearing to support an output shaft 14 that extends therethrough. The housing 1 can be formed with an inner recess to receive a stator 5 to be coupled to the housing with a stator support ring 6. A rotor 8 can be coupled at least partially within a diameter of the stator 5. The rotor 8 and stator 5 form the core components of a servo motor for the output shaft 14.

A torque sensor assembly 50 can be coupled on an inner radial portion to the output shaft 6. The torque sensor assembly 50 includes a "shaft" 9 can be radially coupled to the output shaft 14 and mounted in proximity to the rotor 8. A torque spring 10 can be coupled with an inner hub 15 to the output shaft 14 and the shaft 9 with a retainer ring 12, and at an outer hub portion is coupled at a fixed rotational position on a stator 30 and mounting plate 27 described below. The torque spring is shown with three elements that provides redundancy in position matching, as shown particularly in FIG. 9. The torque spring 10 is used for measuring torque required to turn the output shaft 14 in operation for an indication of the fluid parameters through the valve as described further below.

An inner board 24 and an outer board 26 for positional tracking can be mounted to the stator 30 and mounting plate 27 for the stator. The stator 30 can be a duplex stator. The stator 30 can be coupled at a fixed rotational position to the retainer ring 12 on one side of the stator and the mounting plate 27 on the other side of the stator. The stator 30 and mounting plate 27 are mounted on the output shaft 14 with a radial bearing, and therefore are not rotationally coupled to the output shaft.

A brake 40 can be mounted to the mounting plate 27 around the output shaft 14. The brake can be activated and deactivated to control the rotation of the output shaft.

Electrical components for power, sensory input, motor control, position determination, torque determination, communications, output, software and firmware updates, and other functions can be mounted on boards 24, 26, 37 and 39. For example, a drive board 37 functions as the drive for the servo motor. A power board 39 provides and controls power to the various components. Advantageously, the electronic components can contain memory and processing capabilities for onboard control without needing constant communication paths outside of the actuator unless desired. The electronic components collectively can act as a motor controller that also can function as a data acquisition hub. The associated boards can have additional outputs for controlling other motors as part in the system.

An upper housing 33 can cover and seal the components in conjunction with the lower housing 1. A sealing cover 46 can be removably coupled with the upper housing for ease of access to components particularly the electronic boards.

As described above, the typical heat load of such components has been lowered to a suitable level in the invention to avoid overheating and being unsuitable for an enclosed sealed housing. The torque sensing is a more efficient measurement for control. A typical system may measure current, but current typically has a spike upon startup that causes difficulty in control. Thus, the typical system measuring current tends to frequently need adjustment and therefore uses more power and has more heat load. The addition of the torque sensor also reduces the uncertainty of torque measurement that is typical with using scaled motor current as a torque estimate. The significantly higher torque measurement accuracy allows the controller to better utilize the torque measurement for more accurate, faster control responses. With the torque sensing and resulting stability in control, less power is needed for a given time period. Further, the integration of the motor, drive, brake, and power supply together with the most heat load separately helps reduce the overall heat load. As shown and described, the invention is even able to use the same output shaft as a common element among most of the components. To the inventor's knowledge, such integration has not been done prior to the invention, but rather separate components in their own housings are assembled in a package to the system. Still further, the drive switching frequency, voltage, and current capacity is carefully matched to the motor to minimize heat that would otherwise be produced from suboptimal motor-drive pairing. In particular, the motor windings were chosen to specifically match the drive impedance and desired output criteria such as torque, voltage, speed, and temperature rating. The motor can regenerate additional energy back-fed through the shaft temporarily to capacitors as a buffer. Still further, the brake operates in two modes. The brake can be energized to a first power, such as at its full rated voltage, to disengage from the output shaft and then depowered to a lower second power at a lower voltage to remain disengaged during operation. The depowering to lower voltage reduces the current through the brake generating significantly less heat from $I^2R$ losses.

The actuator can further allow for several failure modes. The system, upon a failure of power, can fail in place to hold the position prior to power loss. The system, upon a failure in communications, can autonomous hold the last set point. The system, upon a pressure transducer failure, enables a backup. The system, upon a failure of all pressure transducers, can optional hold torque by impedance control, fail in place, or fail open. Further, optionally, if the torque is unable to be measured for control, the system can default over to another mode such current, flow, or pressure.

For further stability, the system avoids unnecessary linear absolute position sensors by writing to an FRAM chip the position of the drive when powering off. When started up, no additional sensing is needed to determine the past position other than a recall from memory.

Figure 10:
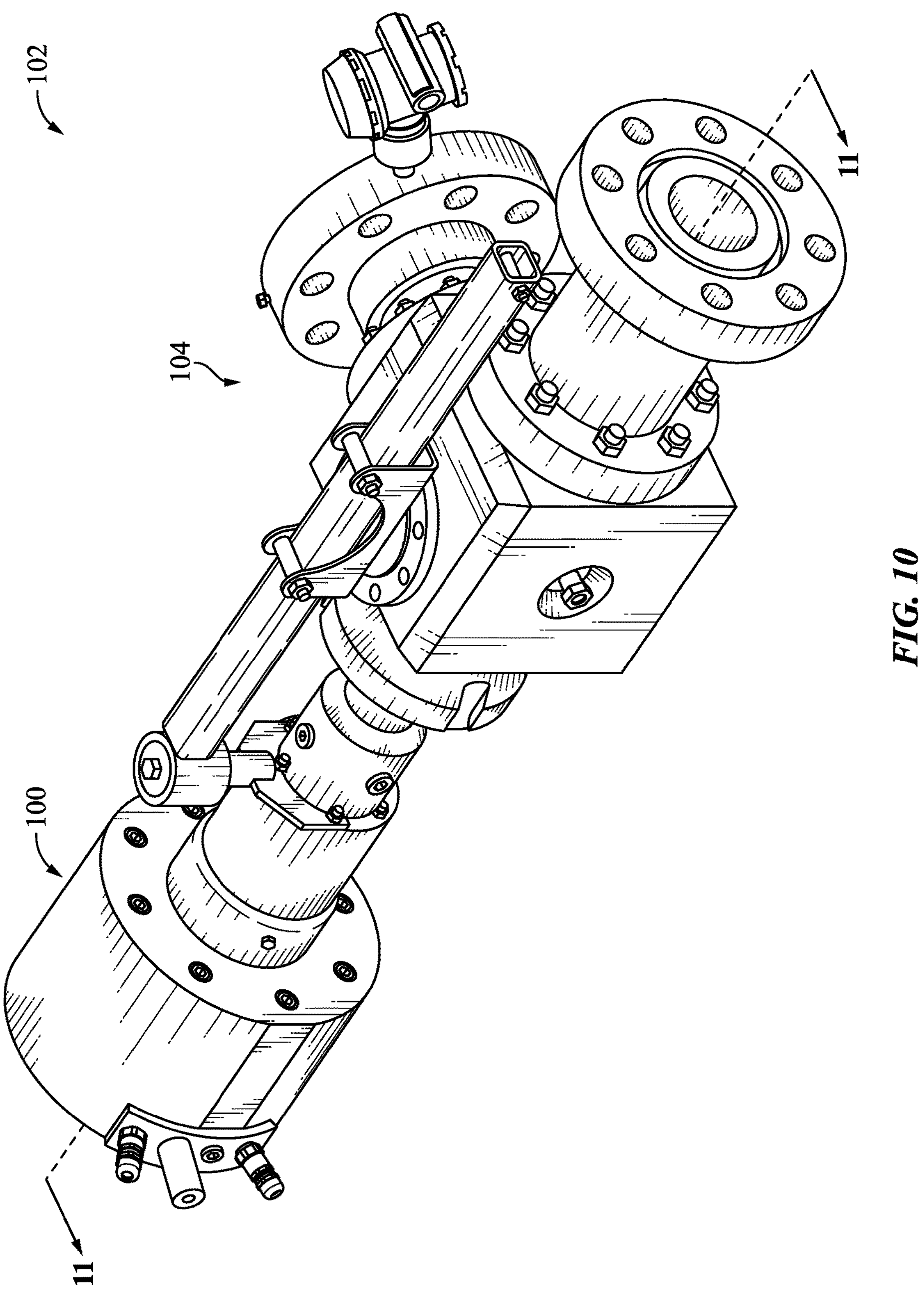
FIG. 10 is an illustrative actuator system with an actuator coupled with a control valve.
Figure 11:
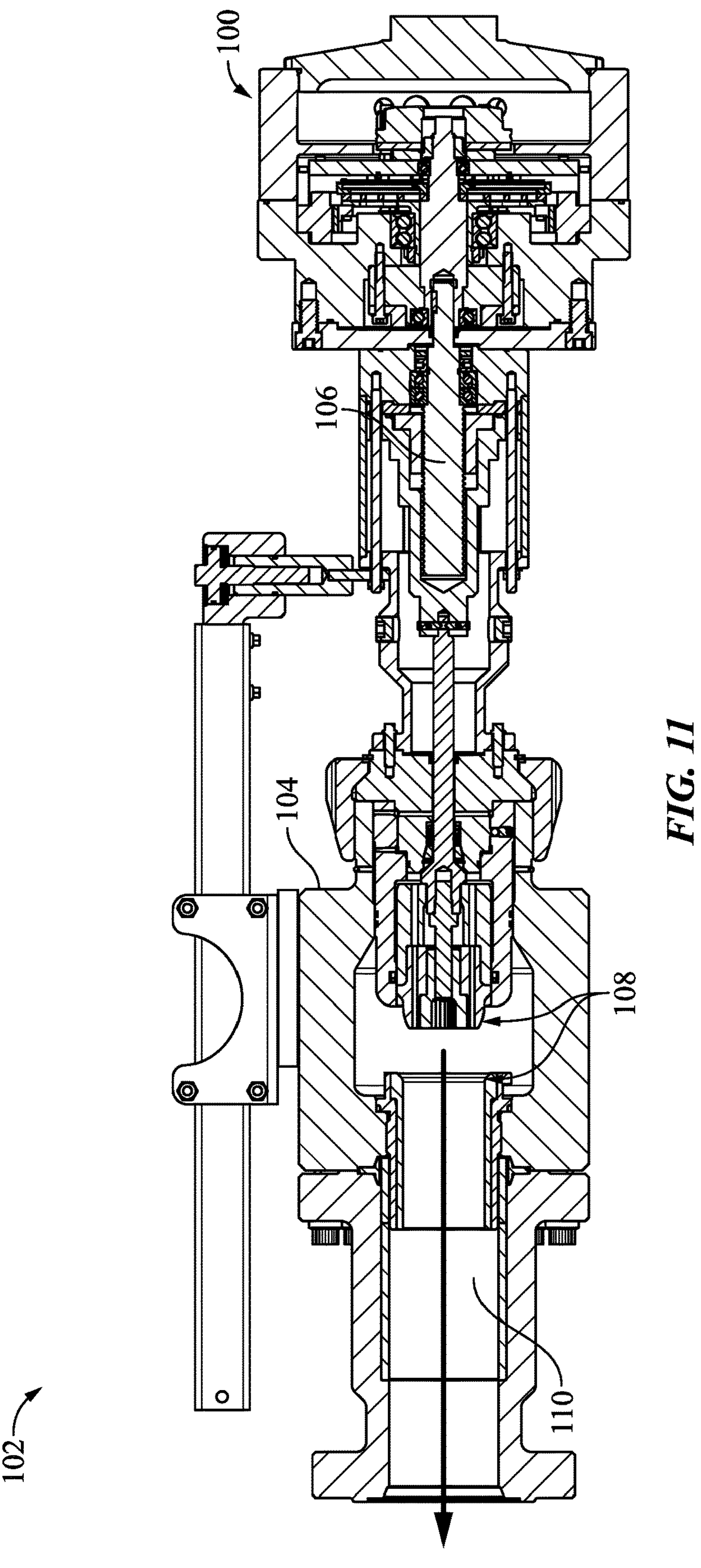
FIG. 11 is an illustrative cross section of the actuator system of FIG. 10.

FIG. 10 is an illustrative actuator system with an actuator coupled with a control valve. FIG. 11 is an illustrative cross section of the actuator system of FIG. 10. The actuator 100 can be used in a system (herein, actuator system 102) to operate a valve or other equipment that is important to know a rotational position and precisely rotationally index that position to another position. In at least one embodiment, the actuator system can include the actuator 100 and a control valve 104. In piping systems, such as an MPD application, the choke valve is used to manage pressure or flow rate. This management is done by taking data points upstream and downstream of the choke valve and comparing the results to a set point parameter. If the readings do not meet this parameter, the choke valve is then adjusted until the set point is met. The choke valve adjustments are done by moving a stem 106 which changes a distance between the plug and seat, known collectively as a trim set 108. The seat in most cases is in a fixed position as installed in the choke valve body and the plug moves toward or away from the seat for the control.

In this invention, the choke valve stem is rotationally coupled with the output shaft 14 of the actuator 100. Torque on the output shaft needed to rotate the valve stem in the choke valve can be measured with the torque sensor assembly 50 and used to control the valve and therefore control the flow. The torque is a parameter that is independent of a change in flow rate and fluid properties, including fluid temperature and fluid pressure. Tracking torque can quickly be used to detect pressure changes in the fluid. Pressure over a known area will generate a linear force, which is then converted to a torsional load through a screw-driven linear drive. The torsional load can be measured with the actuator due to torque sensing through the use of a torsion spring. There is a clear correlation between the torque load observed on the actuator and the amount of pressure being applied by the choke. Torque is an additional parameter not presently used in other pressure control algorithms due to the fact all current methods are unreliable at producing an accurate enough torque reading. Further, using torque as a measurement parameter can allow a large step in pressure with a high degree of accuracy to a different set point. The actuator has the capability to change position holding a torque value constant, this allows the actuator to control the choke using predictive modeling increasing the reaction time of a choke along with allowing the choke to rapidly trap pressure in the event of a rapid loss of flow. With the implementation of torque control, this technology essentially combines the benefits observed from a PID controlled choke with the speed and trapping ability of a pressure balanced choke.

Figure 12:
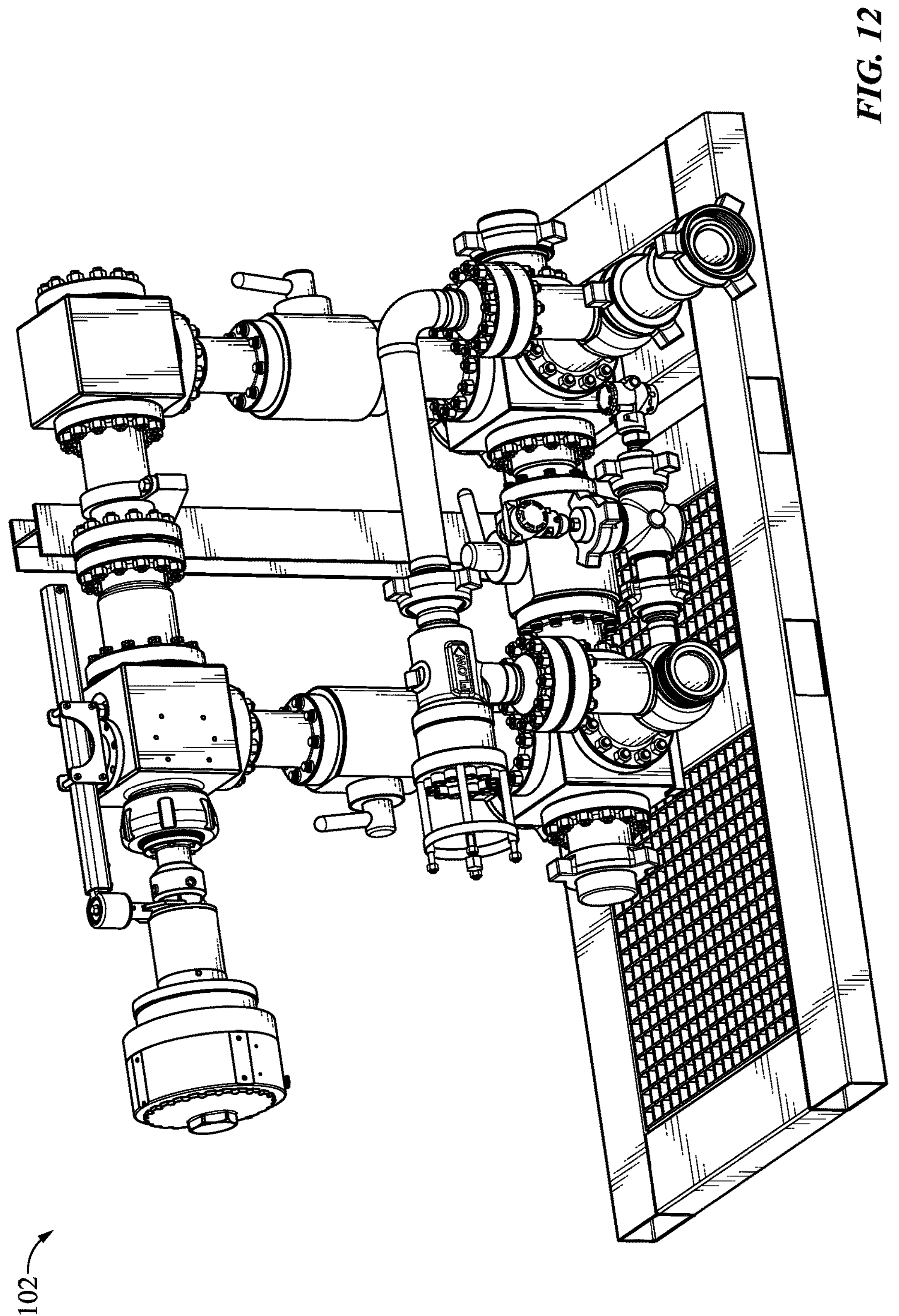
FIG. 12 is an illustrative managed pressure drilling system incorporating the actuator system of FIGS. 10 and 11.

FIG. 12 is an illustrative managed pressure drilling system incorporating the actuator system of FIGS. 10 and 11. The actuator system of the actuator and choke valve can be mounted with other equipment to perform the MPD function. Because the actuator can be so compact, the whole skid can be a small size, such as 4 feet wide by 8 feet long by 6 feet high, which is much smaller than a typical installation.

Figure 13:
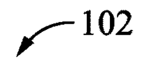
FIG. 13 is an illustrative actuator system with an actuator coupled with a quarter-turn valve.

FIG. 13 is an illustrative actuator system with an actuator coupled with a quarter-turn valve. As another example, the actuator system 102 with actuator 100 can be used to operate a quarter-turn valve 112. The category of a quarter-turn valve includes, for example, plug valves and ball valves. In this embodiment, a gear reduction unit 114 can be used to adjust the speed and power to an appropriate value for the valve 112. Other equipment 116 can be coupled to the actuator system, such as a rotating control device.

While the actuator has been described for use with a control valve and in generally other valves, the actuator is not limited to such applications. Further, the actuator can be equipped with sensors, gauges, and meters for flow and/or pressure measurement, wired and wireless communication capabilities, remote monitoring capabilities, and other features to enhance its functions.

Other and further embodiments utilizing one or more aspects of the inventions described above can be devised without departing from the disclosed invention as defined in the claims. For example, some of the components could be arranged in different locations in the housing, and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. An actuator for rotational equipment, comprising:
- a housing having a plurality of components coupled therein, the housing being sealable from external liquids and gases, the components comprising:
  - a servo motor mounted in the housing, the motor having an output shaft;
  - a torque sensor assembly mounted in the housing and configured to sense torque from rotation of the servo motor output shaft;
  - a motor controller in communication with the torque sensor; and
  - a position encoder in communication with the motor controller.

2. The actuator of claim 1, further comprising a holding brake configured to apply a first power at a first voltage to decouple from the output shaft and then depower to a lower second power at a lower voltage than the first voltage to remain decoupled during operation.

3. The actuator of claim 1, further comprising one or more electronic boards of electronic components coupled in the sealable housing for controlling operation of the actuator.

4. The actuator of claim 1, wherein the actuator is rated for explosive atmospheres.

5. The actuator of claim 1, wherein the actuator is coupled with a control valve.

6. The actuator of claim 1, wherein the actuator is Class 1 Division 1 rated.

7. The actuator of claim 1, wherein the actuator is enclosed and sealed with internal components for operation of the actuator by power supplied to the actuator.

8. The actuator of claim 1, further comprising a processor configured as a data hub for at least one sensor.

9. The actuator of claim 8, wherein the sensor comprises an external sensor to the actuator and is configured to communicate with the processor.

10. The actuator of claim 8, wherein the sensor comprises a pressure sensor.

11. The actuator of claim 1, wherein the actuator is configured to communicate with external actuators for actuating other equipment.

12. The actuator of claim 1, wherein electronic components are capacity matched with a load and configured to collectively reduce a head load of the actuator.

13. The actuator of claim 1, wherein the servo motor comprises motor windings, the motor windings being formed to match a drive impedance and a predetermined output criteria of at least one of torque, voltage, speed, and temperature rating.

14. The actuator of claim 1, wherein the servo motor is configured to regenerate energy through the output shaft temporarily to at least one capacitor configured as a buffer.

15. A method of using an actuator coupled to a rotational equipment having a rotatable shaft, the actuator having a sealable housing with components sealed from an outside explosive atmosphere, the components comprising a servo motor, a torque sensor assembly, a motor controller, and a position encoder, comprising:
- instructing the motor controller to energize the servo motor;
- rotating the valve stem with the servo motor;
- sensing a torque to turn the rotatable shaft with the torque sensor assembly;
- determining a rotational position of the rotatable shaft with the encoder; and
- providing feedback when a desired position of the rotatable shaft is reached to the motor controller to stop instructing the motor controller to energize the servo motor.

16. The method of claim 15, wherein the actuator comprises a holding brake, the method comprising:
- applying a first power at a first voltage to decouple the brake from a shaft of the actuator; and
- depowering to a lower second power at a lower voltage than the first voltage to maintain the brake being decoupled from the shaft during operation of the actuator.

17. The method of claim 15, further comprising reducing heat during operation of the actuator by matching motor windings with a drive impedance and a predetermined output criteria of at least one of torque, voltage, speed, and temperature rating.

18. The method of claim 15, further comprising matching electronic component capacities with corresponding heat loads from equipment coupled thereto and reducing actuator heat load.

19. The actuator of claim 1, wherein the torque sensor assembly is configured to measure the torque on the output shaft needed to rotate at least a portion of the rotational equipment and the actuator is configured to use the torque to control the rotational equipment.

20. The actuator of claim 1, wherein the actuator is configured to respond to differences in measured torque by the torque sensor assembly.

21. The actuator of claim 1, wherein the actuator is configured to respond to pressure changes in a fluid based on changes in torque measured by the torque sensor assembly.

22. The actuator of claim 1, wherein the actuator is configured to control the rotational equipment based on a predictive algorithm that increases reaction speed.

* * * * *